Patented Apr. 20, 1926.

1,581,179

UNITED STATES PATENT OFFICE.

EDWIN H. CROFOOT, OF MASON CITY, IOWA, ASSIGNOR TO LARROWE CONSTRUCTION COMPANY, OF DETROIT, MICHIGAN, A CORPORATION OF MICHIGAN.

ANTIFREEZING SOLUTION.

No Drawing. Application filed January 16, 1920, Serial No. 351,933. Renewed September 18, 1925.

*To all whom it may concern:*

Be it known that I, EDWIN H. CROFOOT, a citizen of the United States of America, residing at Mason City, in the county of Cerro Gordo and State of Iowa, have invented certain new and useful Improvements in Antifreezing Solutions, of which the following is a specification.

The invention relates to anti-freeze compounds, such as are used in automobile radiators and for similar purposes, and it is the object of the invention to obtain an inexpensive material which is highly efficient for the purpose.

In the manufacture of beet sugar, after the sugar content has been extracted, there is left a liquor containing mineral salts and various soluble organic compounds. This material in some plants is a waste product and in others is treated for the extraction of the mineral content. It is known by various names, according to the particular process which is used in the sugar extraction, but in one process largely used it is designated as "Steffen's waste water." I have discovered that if this waste product is suitably concentrated, it will produce a liquid well adapted for use as an anti-freeze solution. The anti-freeze character may be partly due to the content of mineral salts, but I am led to believe from tests that have been made that this content alone does not account for all of its properties and that probably the organic compounds are also useful.

In the manufacture of the anti-freezing compound the Steffen's waste water, or equivalent waste liquor, as it is first extracted from the filter presses is boiled down or otherwise concentrated. The concentration is preferably carried to a point having the least water content without either breaking down of any of the ingredients or the falling of the same out of solution. In this form it can be conveniently shipped and marketed; but when prepared for actual use, it may be further diluted. The degree of dilution depends upon the temperature to which the liquid is subjected, but I have found that a concentration of 54 Brix. can be subjected to a temperature of twenty below zero without freezing.

My improved anti-freeze compound can be manufactured at much smaller cost than alcohol, glycerine, and other materials usually employed for the purpose. Also it can be used without any injury to the radiator, or other parts of the circulating system.

Where the Steffen's waste water is obtained from a process using lime, there will be a certain amount of calcium hydrate in solution. This is preferably eliminated by carbonation before the liquid is concentrated.

What I claim as my invention is:

1. The combination with a radiator, of an anti-freezing cooling fluid in said radiator, comprising waste liquor from sugar extraction processes.

2. The combination with a radiator, of an anti-freezing cooling fluid in said radiator, comprising concentrated Steffen's waste water.

In testimony whereof I affix my signature.

EDWIN H. CROFOOT.